United States Patent
Kawahara

(10) Patent No.: US 9,022,297 B2
(45) Date of Patent: May 5, 2015

(54) TRIGGER SIGNAL GENERATING DEVICE AND MOVING OBJECT MANAGEMENT SYSTEM

(71) Applicant: Matrix Inc., Osaka (JP)

(72) Inventor: Takeshi Kawahara, Osaka (JP)

(73) Assignee: Matrix Inc., Osaka (JP)

( * ) Notice: Subject to any disclaimer, the term of this patent is extended or adjusted under 35 U.S.C. 154(b) by 0 days.

(21) Appl. No.: 14/377,200

(22) PCT Filed: Oct. 1, 2012

(86) PCT No.: PCT/JP2012/075419
§ 371 (c)(1),
(2) Date: Aug. 7, 2014

(87) PCT Pub. No.: WO2014/054102
PCT Pub. Date: Apr. 10, 2014

(65) Prior Publication Data
US 2014/0346229 A1    Nov. 27, 2014

(51) Int. Cl.
*G06K 19/06* (2006.01)
*G06K 7/10* (2006.01)
*G01S 3/00* (2006.01)
*G06K 19/077* (2006.01)
*H01Q 1/22* (2006.01)
*H01Q 17/00* (2006.01)

(52) U.S. Cl.
CPC .............. *G06K 7/10178* (2013.01); *G01S 3/00* (2013.01); *G06K 19/07749* (2013.01); *H01Q 1/2208* (2013.01); *H01Q 1/2225* (2013.01); *H01Q 17/00* (2013.01); *G06K 7/10336* (2013.01); *G06K 7/10356* (2013.01)

(58) Field of Classification Search
CPC ................. G06K 19/0723; G06K 19/07749; G06K 19/0709; G06K 19/0712; G06K 7/10336; G06K 7/10356; H01Q 1/2225; H01Q 17/00; A01B 12/006
USPC .................................. 235/440, 492, 449, 493
See application file for complete search history.

(56) References Cited

U.S. PATENT DOCUMENTS
2009/0179742 A1    7/2009 Takeshima et al.

FOREIGN PATENT DOCUMENTS
| JP | 2006048399 A | 2/2006 |
| JP | 2007299052 A | 11/2007 |
| JP | 2008217496 | 9/2008 |

*Primary Examiner* — Kristy A Haupt
(74) *Attorney, Agent, or Firm* — Lowe Hauptman & Ham, LLP

(57) ABSTRACT

A trigger signal generating device outputs a trigger signal activating an IC tag. The trigger signal generating device includes first and second trigger coils placed at a predetermined separation distance and each having predetermined magnetic field intensity distribution. Each of the first and second trigger coils includes attenuating means for attenuating intensity of a magnetic field generated by the first and second trigger coils to a predetermined level that allows the ID tag to detect trigger IDs of the first and second trigger coils on a side on which the first and second trigger coils are provided, and that does not allow the ID tag to detect the trigger ID of the first trigger coil on an opposite side to the side on which the first and second trigger coils are provided.

7 Claims, 14 Drawing Sheets

DISTANCE IN X-DIRECTION [m]

DISTANCE IN X-DIRECTION [m]

DISTANCE IN X-DIRECTION [m]

TRIGGER SIGNAL GENERATING DEVICE AND MOVING OBJECT MANAGEMENT SYSTEM

TECHNICAL FIELD

The present invention relates to trigger signal generating devices and moving object management systems, and more particularly to compact trigger signal generating devices and moving object management systems.

BACKGROUND ART

Conventionally, systems that manage a moving object by using a trigger signal are disclosed in, e.g., Japanese Unexamined Patent Publication Nos. 2006-48399 (Patent Literature 1) and 2008-217496 (Patent Literature 2). According to Patent Literature 1, directivity of a tag matches a magnetic field generated by a trigger coil, and the detection range of the tag is produced which substantially matches the opening direction of the trigger coil. Since a magnetic field sensor is a uniaxial sensor, the direction of the tag needs to be constant with respect to its moving direction. The moving direction of the moving object can be detected by the difference between the detection times of the tag passing by trigger coils located at adjacent two positions. According to Patent Literature 2, since a tag is non-directional, the response range of the tag extends entirely around a trigger and has a shape close to a sphere. A smaller response region can be produced by interposing the trigger between other triggers. Patent Literature 2 is highly advantageous in that the way the tag is held is not limited because detection is performed three-dimensionally (3D).

CITATION LIST

Patent Literatures

PTL 1: Japanese Unexamined Patent Publication No. 2006-48399
PTL 2: Japanese Unexamined Patent Publication No. 2008-217496

SUMMARY OF INVENTION

Technical Problem

The conventional systems for managing a moving object by using a trigger signal are configured as described above. FIG. 19A shows the detection range of the tag in the case where the magnetic field is detected by a uniaxial coil of Patent Literature 1. The width by length of the coil is 0.7 m×2 m. FIG. 19B shows the detection range of the tag in the case where the magnetic field is detected by a 3D coil of Patent Literature 2. The width by length of this coil is also 0.7 m×2 m.

In both Patent Literatures, installation work is required to embed such a coil having a large shape of a few meters in a ceiling or a passageway etc., and the system needs to be designed in view of the moving range and the direction of the moving object, leakage to a surrounding passageway, etc. Thus, design work is required for the existing facilities. Installation is therefore not easy, preventing widespread use of the system.

One solution to such problems is reduction in size of trigger coils. Many types of coils have been designed for detection of the direction of a moving object. Conventionally, small coils (ferrite coils) that can be designed to have a response region as large as several meters have been designed with a coil that is wound about a ferrite material having high magnetic permeability. However, the intensity of the magnetic field that is produced by the ferrite coil has a shape close to a sphere as observed three-dimensionally. Since the opening surface of the coil is very small, there is no range where a change in magnetic field is small. The magnetic field intensity attenuates in inverse proportion to the cube of the distance from the coil. It is therefore difficult to create a large detection area. If the magnetic field intensity range (dynamic range) as the capability of the tag is 64 dB (1 to 1,259 times), the ratio of the magnetic field intensity at the closest position to the magnetic field intensity at the farthest position is 10.79. For example, the detection range is the range of 20 cm to 2.16 m from the position of the trigger coil.

FIGS. 20A and 20B show response regions of the tag which are obtained by connecting spheres produced by trigger generators ID1, ID2 of two IDs. FIG. 20A shows an example in which the trigger generators ID1, ID2 are separated from each other by a certain distance. FIG. 20B shows an example in which the two trigger generators ID1, ID2 are located close to each other in order to implement a compact trigger generator. As shown in FIG. 20A, in order to decide the moving direction of the moving object in the exclusive areas of the two regions shown in a Venn diagram, the triggers of the two IDs are switched by time to detect which of the trigger generators ID1, ID2 has activated the tag. In order to obtain the exclusive areas, the trigger coils of the two IDs need to be separated from each other. Conventionally, as shown in FIG. 20A, the trigger coils of the two IDs are separated from each other by about the radius of the sphere.

A compact configuration can be implemented by placing the trigger generators as shown in FIG. 20B. However, the moving direction of the moving object cannot be determined by the method described above. Accordingly, reduction in size and integration of the trigger generators cannot be implemented.

Detection is performed three-dimensionally (hereinafter referred to as "3D") in Patent Literature 2. In the case of detecting a magnetic field in a 3D manner, formation of the magnetic field cannot be limited to only above the opening surface of the coil because a magnetic field having a cocoon shape is formed around the coil. However, if coils are placed on both sides of the coil at an appropriate distance from the coil, the magnetic field to be detected can be formed only above the opening surface of the coil interposed between the coils. Such a detection region like a wall is formed because the magnetic fields of the triggers on both sides are designed so that digital codes of these magnetic fields are placed in intervals in an OOK (ASK) digital code of the magnetic field produced by the central trigger so as to make the code generated by the central trigger invalid or an error.

If the ratio between the levels of the signals detected by the tag is high (2 to 1, 3 to 1, etc.) in the region where the magnetic fields overlap each other, one of the signals is detected. Invalid data or an error is detected in the region where the levels of the signals detected by the tag are approximately the same. For this reason, the magnetic field of the central trigger is detected as a magnetic field like a wall.

In Patent Literatures 1 and 2, the transmission period of the trigger coils is determined in view of the width of a passageway and the required detection time for detection of the moving object holding the tag. If the coil width is about the same as the width of the passageway and the period of data notifying that the tag stays in the transmission area is about 50 ms, data is obtained at least three times during 0.2 s. Accordingly, a quadrilateral frame-shaped coil is required which has a width calculated from the travel distance of the moving object for 0.2 s (in the case of a person, 0.5 m or more if he/she moves at about 7 km/h (2 m/s)). A trigger area is therefore produced by placing such a coil in a road surface or a ceiling.

Patent Literatures 1 and 2 therefore have a problem that the coil forming the trigger area has a large size.

Patent Literature 2 also has the following problem. FIG. 21 shows an example of the intensity of the magnetic field that is produced by a single trigger coil having a coil shape of 0.7 m by 2 m in Patent Literature 2 and is detected by a 3D tag. FIG. 22 shows the positional relation between a trigger coil 31 and an ID tag (hereinafter sometimes simply referred to as the "tag") 32 in this case. When the tag 32 is moved at a height of 0.1 m along the center of the rectangular trigger coil 31 having a shorter side of 0.7 m (the longer side is not specifically defined) as shown in FIG. 22, the difference of 18.06 dB is expected between the distance of 1 m and the distance of 2 m, because the intensity of the magnetic field is inversely proportional to the cube of the distance and thus the intensity of the magnetic field at the distance of 2 m should be ⅛ of that at the distance of 1 m. However, due to the influence of the shape of the trigger coil, the intensity of the magnetic field is 19.36 dB at the distance of 1 m and is 2.36 dB at the distance of 2 m. Thus, the difference is therebetween is 17 dB, which is slightly less than 18 dB. The magnetic field changes only slightly above the opening of the trigger coil 31. Namely, a change in magnetic field is flat and gradual above the opening of the trigger coil 31.

A graph shown in FIG. 23 is obtained in the case where the three trigger coils in Patent Literature 2 are arranged so that they can deliver their expected performance. In this example, each trigger coil (hereinafter sometimes simply referred to as the "coil") has a width of 70 cm and a depth of 2 m, and the interval between the coils is 70 cm. In this graph, X-axis represents the position (cm) and Y-axis represents the magnetic field intensity (dB). The detection range of the trigger coil (central gate) provided in the center is shown by thick line in the upper part of the graph. This graph shows a detectable range at the magnetic field intensity of 10 and an undetectable range at the magnetic field intensity of 0.

Referring to FIG. 23, the range having a value of 10 in the detection range is 1.2 m. This range means a range where the intensity of the magnetic field is twice or more the intensity of the magnetic field produced by the coils on both sides.

In FIG. 23, a change in magnetic field intensity was observed at 0.1 m above the coil. As shown in FIG. 24, a change in magnetic field intensity becomes gentle when observed at a height of 1.5 m. As the change in magnetic field intensity becomes gentle, attenuation becomes gentle, and the range that is not interfered by the central gate (the range with magnetic field intensity of 10, which is shown by thick line in the center of the upper part of the graph) becomes as narrow as 0.4 m. As the change in magnetic field intensity becomes gentle, the detection range cannot be produced if the separation distance between adjacent triggers is small, because these triggers cancel each other.

The present invention was developed in order to solve the above problems, and it is an object of the present invention to provide a compact trigger signal generating device having a large detection area and a moving object management system using the same.

Solution to Problem

A trigger signal generating device outputs a trigger signal activating an IC tag. The trigger signal generating device includes: first and second trigger coils placed so as to face each other at a predetermined separation distance and each having predetermined magnetic field intensity distribution; and attenuating means for attenuating intensity of a magnetic field generated by the first and second trigger coils to a predetermined level that allows the ID tag to detect trigger IDs of the first and second trigger coils on a side on which the first and second trigger coils are provided, and that does not allow the ID tag to detect the trigger ID of the first trigger coil on an opposite side to the side on which the first and second trigger coils are provided.

Preferably, the attenuating means is a magnetic field attenuating material provided between the first and second trigger coils.

More preferably, the magnetic field attenuating material is a non-magnetic metal.

The first and second trigger coils may be held by a holding member having one surface and the other surface which face each other, the first and second trigger coils may generate the same magnetic field intensity distribution, and the attenuating means may be means for shifting the magnetic field intensity distribution generated by the first trigger coil and the magnetic field intensity distribution generated by the second trigger coil from each other by a predetermined level.

The trigger coils may be made of ferrite.

The ID tag is preferably an ID tag capable of detecting three-dimensional magnetic field intensity.

In another aspect of the present invention, a moving object management system uses the trigger signal generating device.

Advantageous Effects of Invention

In the trigger signal generating device that outputs a trigger signal activating an ID tag, each of the first and second trigger coils placed so as to face each other at the predetermined separation distance and each having the predetermined magnetic field intensity distribution attenuates the intensity of the magnetic field generated by the first and second trigger coils to the predetermined level that allows the ID tag to detect the trigger IDs of the first and second trigger coils on the side on which the first and second trigger coils are provided, and that does not allow the ID tag to detect the trigger ID of the first trigger coil on the opposite side to the side on which the first and second trigger coils are provided.

Accordingly, a compact trigger signal generating device in which one trigger coil is not affected by the other can be implemented by reducing the separation distance between the trigger coils to as small as several millimeters to slightly over ten centimeters.

As a result, a compact trigger signal generating device having a large detection area and a moving object management system using the same can be provided.

DESCRIPTION OF EMBODIMENTS (1) Principles of the Present Invention

First, principles of the present invention will be described. In the present invention, a coil of a trigger signal generating device is designed by using ferrite. Designing coils by using ferrite is advantageous for reduction in size of trigger signal generating devices because the shape of the coils can be made much smaller with the same inductance. If this mechanism is made compact so as to be fitted in a small box, the detection area of the central coil becomes very narrow even if a flat region is formed, as in Patent Document 2. Accordingly, the central coil is eliminated, and this mechanism is formed by using two coils on both sides.

Figure 1:
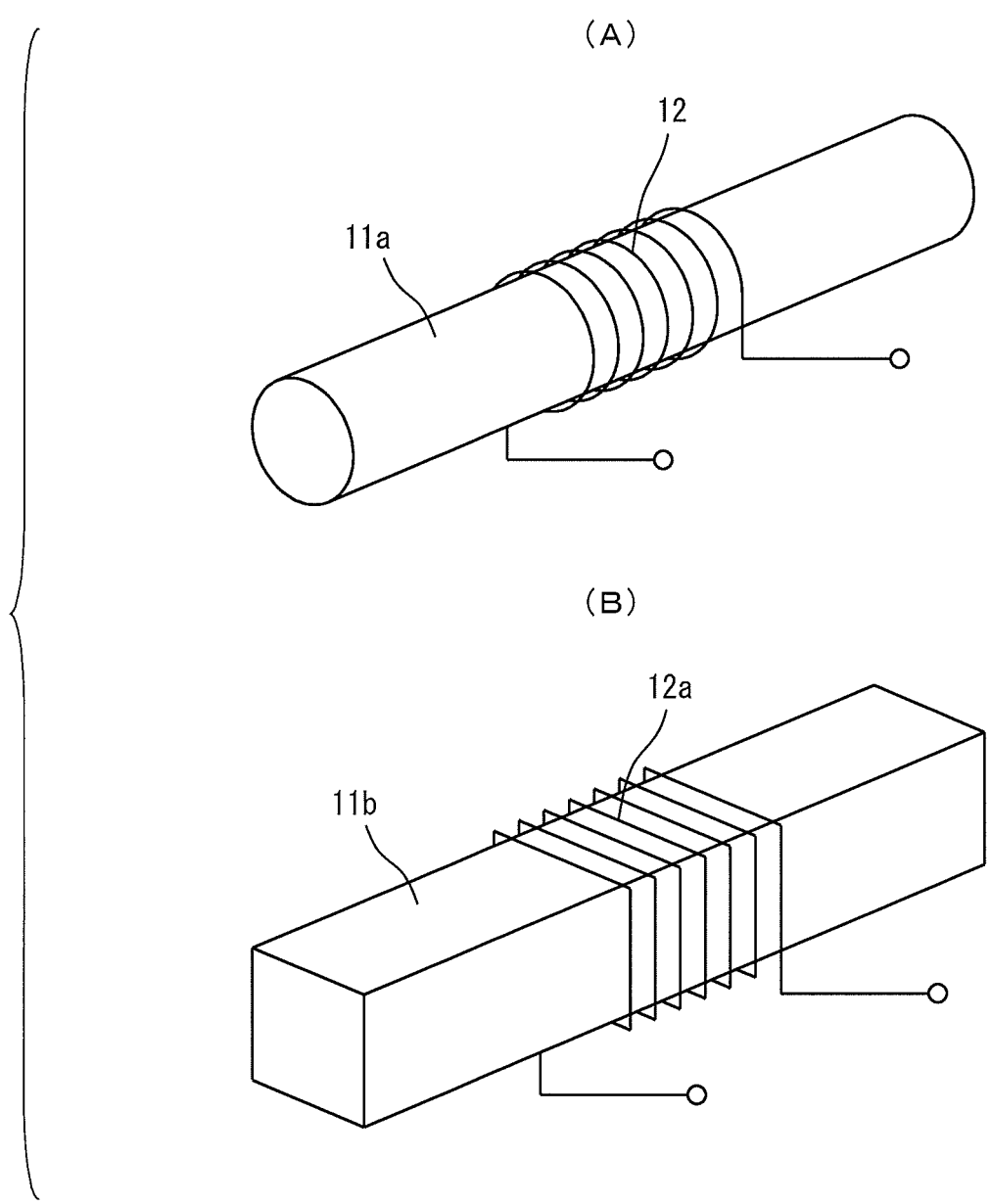
FIGS. 1A and 1B are perspective views of a trigger coil according to an embodiment of the present invention.
Figure 16:
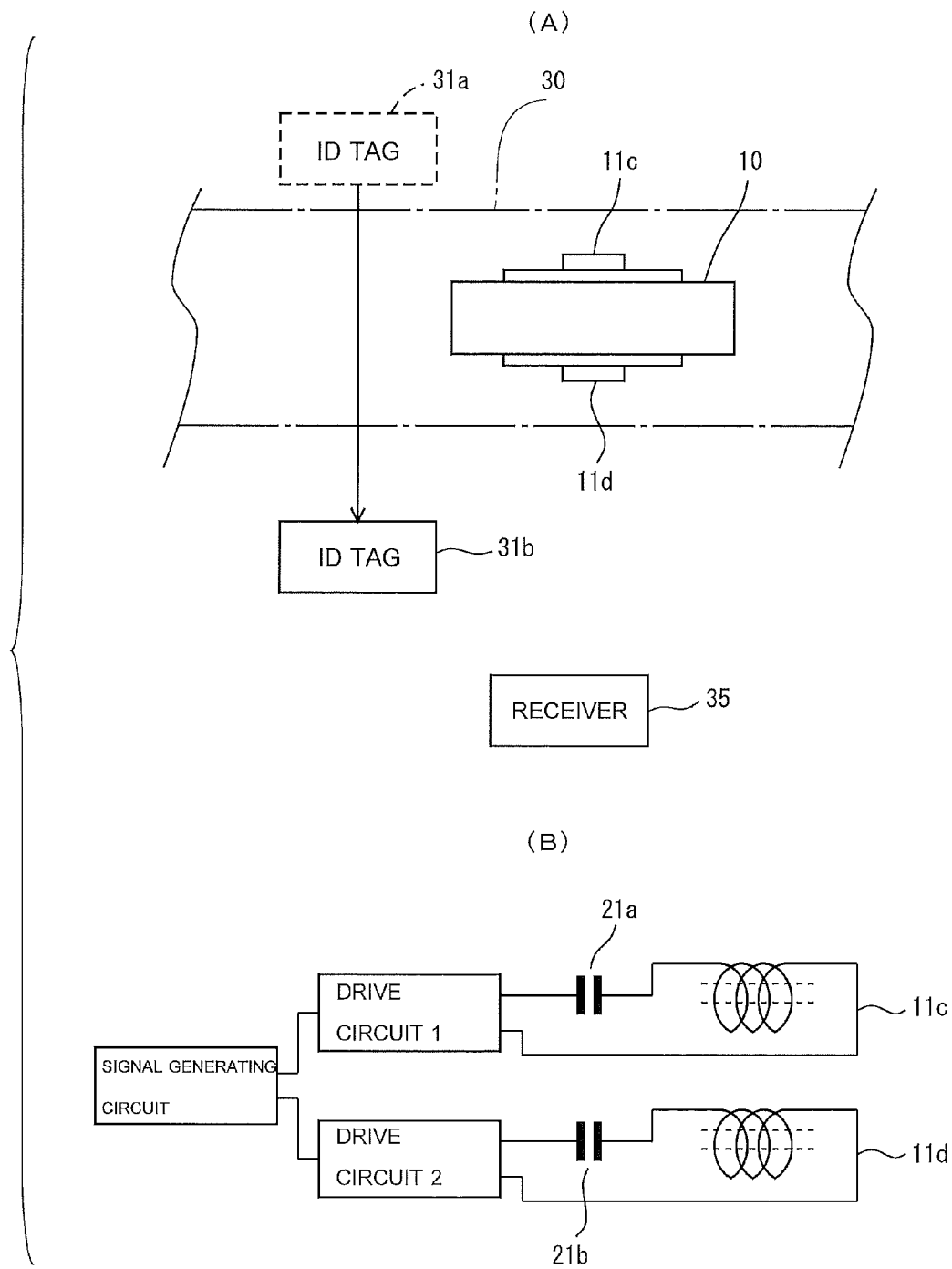
FIGS. 16A and 16B are diagrams showing the overall configuration of a moving object management system using the trigger signal generating device.

FIGS. 1A and 1B are perspective views of a ferrite coil 11 that is used in a trigger signal generating device according to an embodiment of the present invention. FIG. 1A shows a ferrite coil 11a having a cylindrical shape, and FIG. 1B shows a ferrite coil 11b in the shape of a rectangular parallelepiped. The ferrite coil 11a is made of ferrite and has a diameter of 5 mm and a length of 150 mm. The ferrite coil 11b is made of ferrite and has a shorter side of 5 mm and a length of 150 mm. The ferrite coil 11b can be embodied with a shorter side of about 5 mm to 30 mm and a length of about 30 mm to 200 mm. A copper wire 12 is wound around a central portion of the ferrite coil 11 (hereinafter including 11a and 11b). The ferrite coil 11 is connected to resonant capacitors 21a, 21b and drive circuits 1, 2 of two channels and a signal generating circuit, which are shown in FIG. 16B, and thus outputs a trigger signal.

Figure 2:
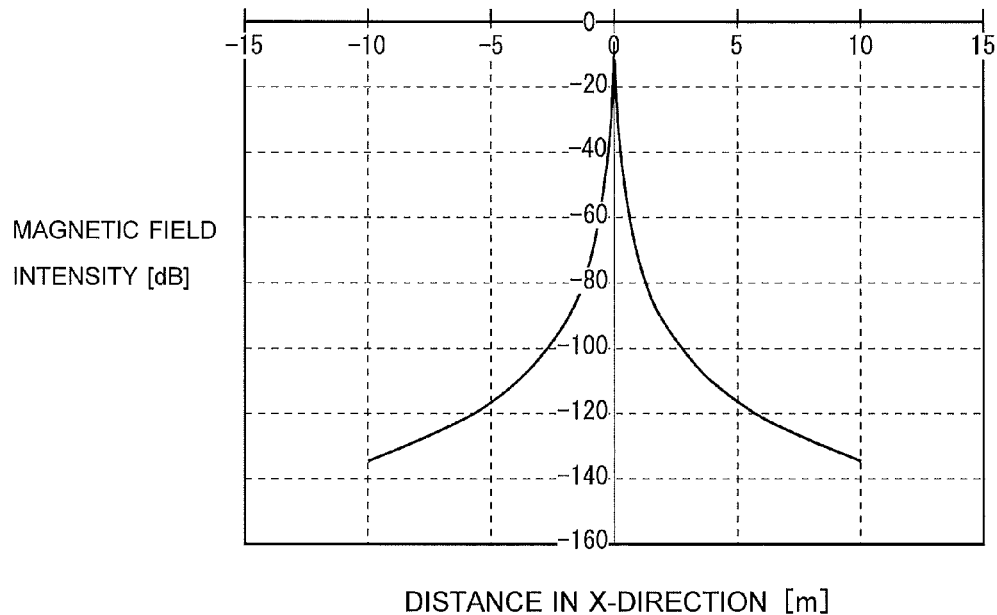
FIG. 2 is a diagram showing the relation between the distance from a ferrite coil and the magnetic field intensity.
Figure 3:
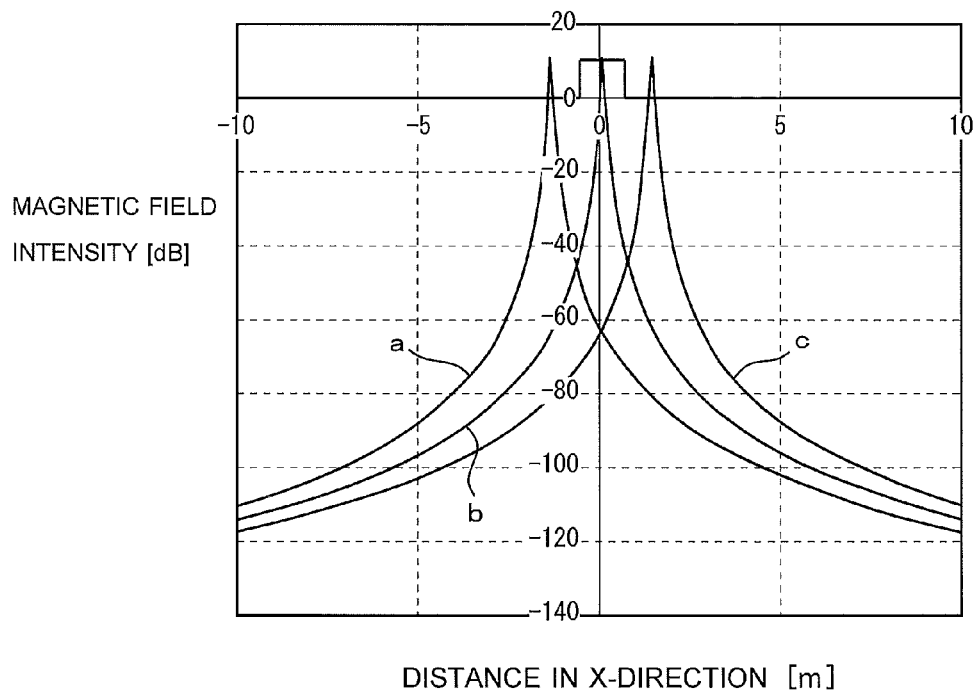
FIG. 3 is a diagram showing the relation between the distance from a trigger coil and the magnetic field intensity in three gates in the case where the gates are formed at the same intervals as a conventional example by using the ferrite coil shown in FIG. 2.
Figure 24:
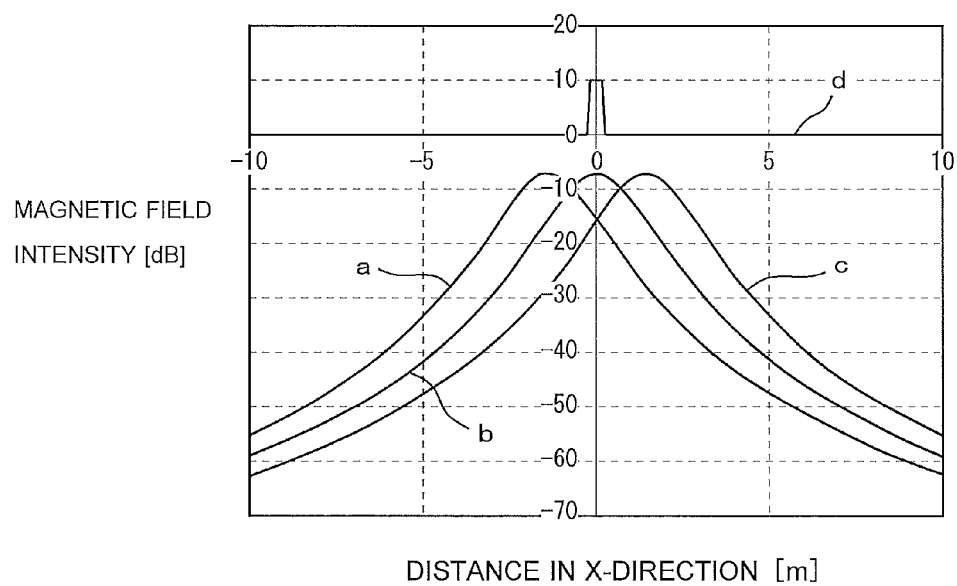
FIG. 24 is a diagram showing the case where the tag is held at an upper limit height of 1.5 m.

FIG. 2 is a diagram showing the relation between the distance from the ferrite coil 11 (X-axis) and the magnetic field intensity (Y-axis). Referring to FIG. 2, the magnetic field intensity is inversely proportional to the cube of the distance. Accordingly, at the distance ratio of 5 m to 10 m, the difference of 18.06 dB is obtained as the ratio of the magnetic field intensity is ⅛. FIG. 3 is a diagram showing the relation between the distance from the trigger coil and the magnetic field intensity in three gates "a" (outer gate), "b" (central gate), and "c" (inner gate) in the case where the gates are formed at the same intervals as the conventional example by using the ferrite coil 11 shown in FIG. 2. FIG. 3 corresponds to FIG. 24 showing the conventional example. In this figure, the detection width of the central gate at the time a tag is located at a height of 0.1 m is 1.21 m as shown by a protruding portion indicated by thick line in the upper part of the graph.

Figure 4:
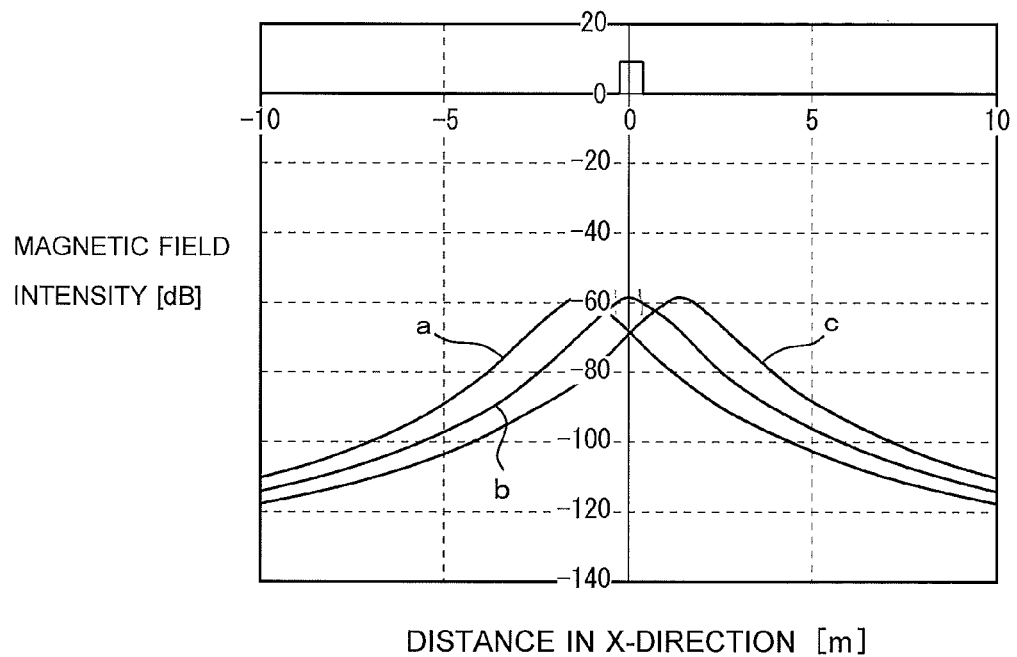
FIG. 4 is a diagram showing the detection width of the central gate at the time a tag is located at a height of 1.5 m.

The obtained detection width of the gate is similar to the conventional example. However, as shown in FIG. 4, the detection width of the central gate at the time the tag is located at a height of 1.5 m is 0.62 m. Namely, attenuation of the detection width is reduced. This is because an attenuation curve produced by the coil, which is a curve inversely proportional to the cube of the distance, starts immediately above the coil.

In the present embodiment, in order to reduce the size of the ferrite coil 11, the moving direction of the tag need only be able to be detected, and the central gate that is provided in the conventional example is omitted. The magnetic field intensity needs to attenuate sharply in order to allow adjacent trigger coils to be located closer to each other. However, extreme attenuation means a shorter communication distance. The magnetic field sensitivity of the tag that is used herein is a dynamic range of 64 dB. Accordingly, the operating range according to this dynamic range corresponds to the distance ratio of 10.79 under the condition that the magnetic field intensity is inversely proportional to the cube of the distance. Since typical passageways have a width of 2 m, the trigger coils can be designed with a magnetic field having a radius of 0.1 m to 1 m. If attenuation is sharp, the trigger coils can be located closer to each other, but the operating range is reduced.

Figure 5:
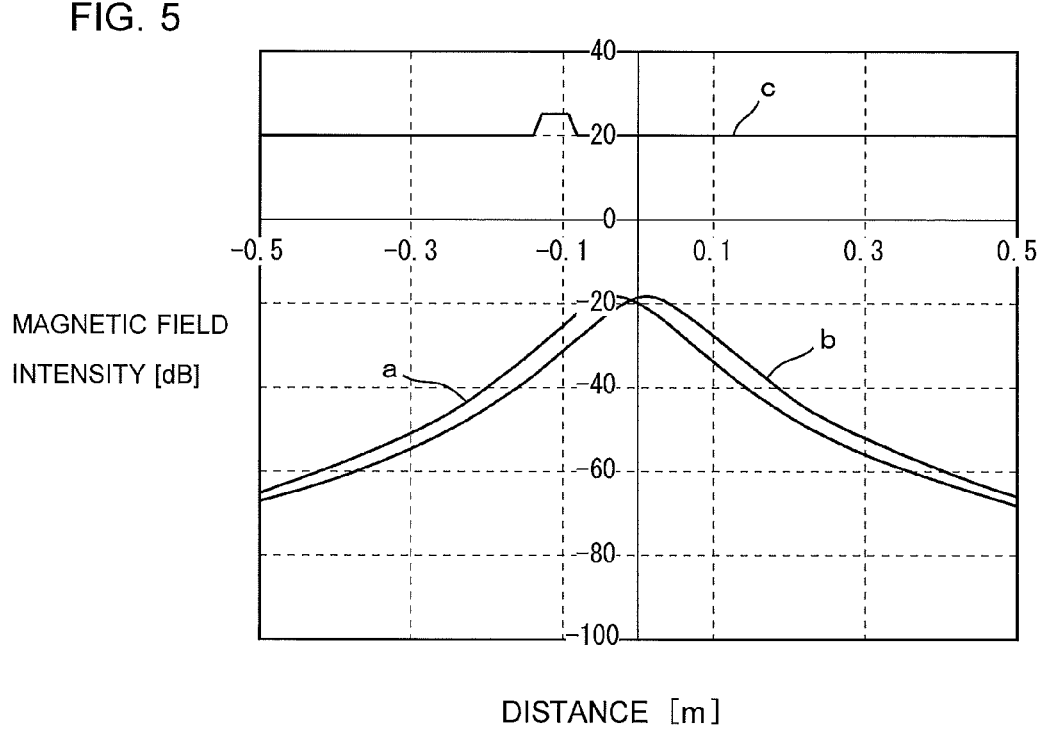
FIG. 5 is a diagram corresponding to FIG. 4, showing the case where a trigger coil 1 and a trigger coil 2 are located closer to each other so as to be separated from each other by 4 cm.
Figure 6:
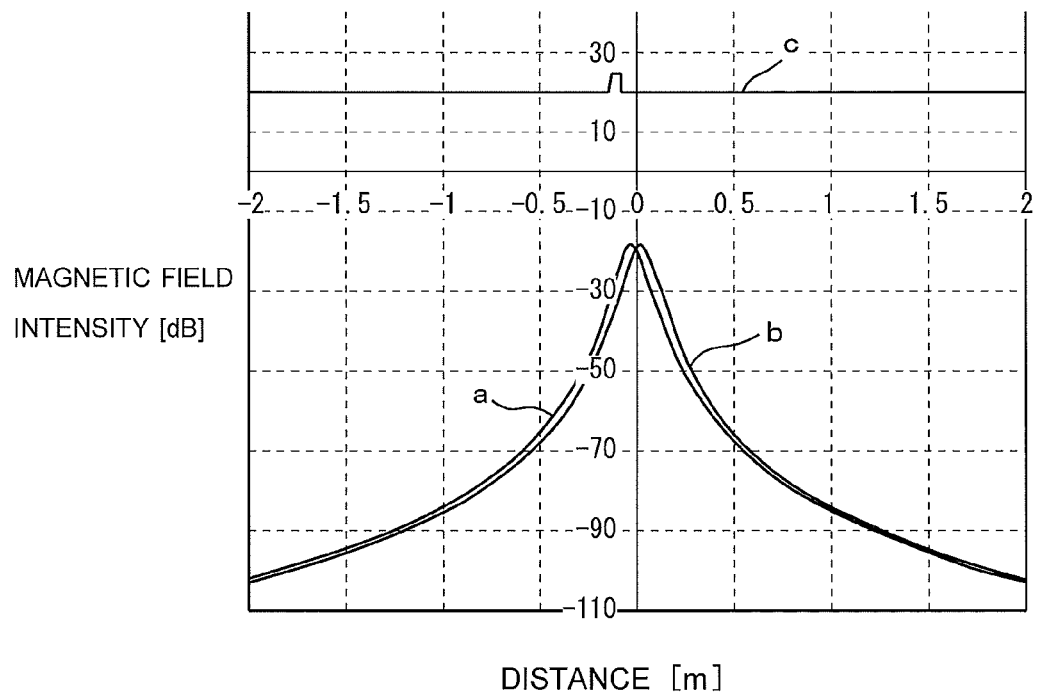
FIG. 6 is a diagram showing a larger range of FIG. 5.

FIG. 5 is a diagram corresponding to FIG. 4, showing the case where a trigger coil 1 ("a" in the figure) and a trigger coil 2 ("b" in the figure) are located closer to each other so as to be separated from each other by 4 cm. Referring to FIG. 5, the range in which only the trigger 2 can be detected (the protruding portion in the upper part of the graph) is about 2 cm. Accordingly, two areas cannot be produced if the trigger coils 1, 2 are separated from each other by 4 cm. FIG. 6 is a diagram showing a larger range of FIG. 5.

Figure 7:
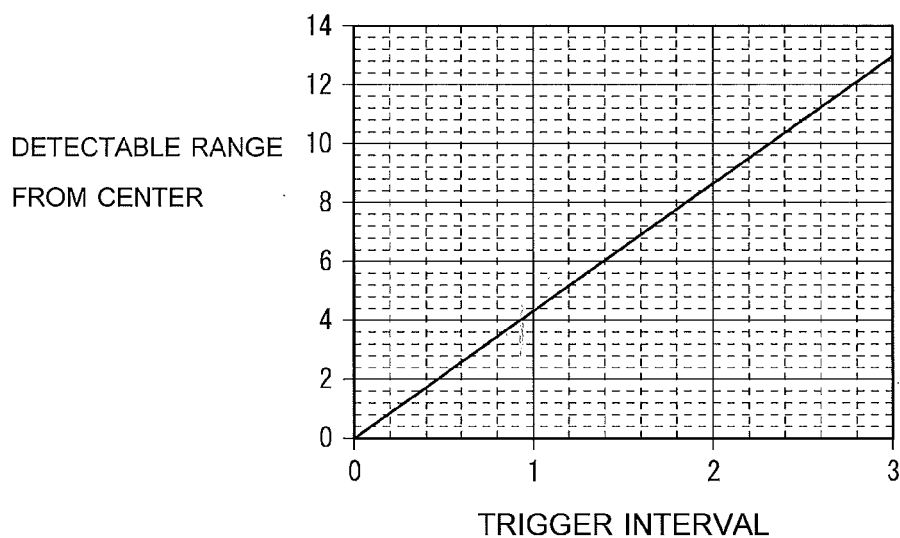
FIG. 7 is a graph showing the relation between the interval between the trigger coils and the detectable range.

FIG. 7 is a graph showing the relation between the interval between the trigger coils and the detectable range based on the above description. In the graph, the unit is meter. In the graph, such an operation detection range of the tag that the level ratio between the two triggers is 1 to 0.5 is obtained according to the separation interval between the two ferrite trigger coils. The graph is obtained by the following formula.

The ratio D/U of a necessary signal D to an unnecessary signal U is 1 to 0.5.

Based on the relation of 1/0.5=2=(detection distance+interval/2)/(detection distance−interval/2), detection distance=interval/2*(1+1.26)/(1.26−1).

$1.26 = \sqrt[3]{2}$

Referring to FIG. 7, for example, the triggers need to be separated from each other by about 0.9 m in order to produce outside each trigger a trigger area of 4 m from the center of each trigger.

Figure 8:
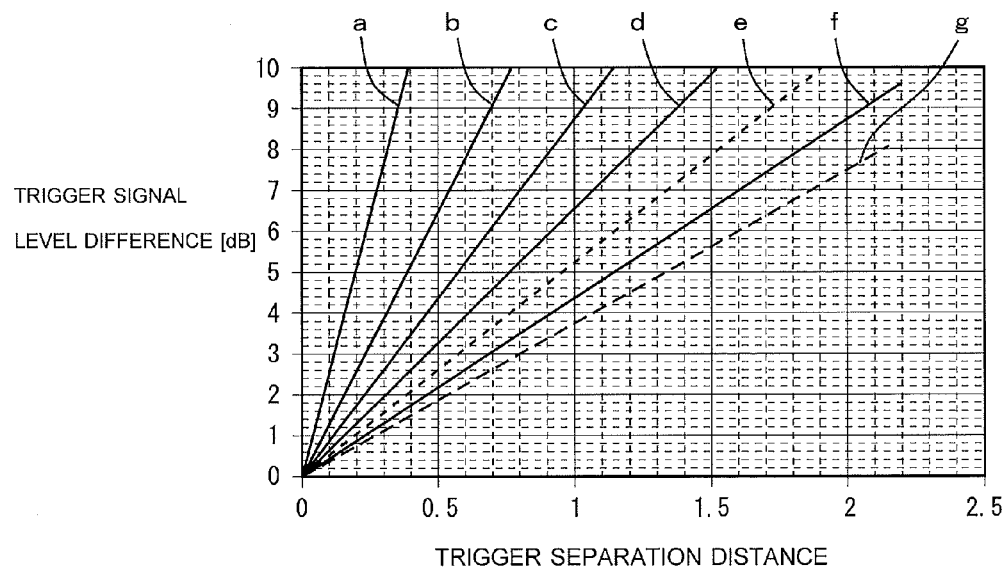
FIG. 8 is a diagram showing the separation distance between the trigger coils and the difference in level of magnetic field intensity between the triggers at a remote point detected by the tag.

FIG. 8 shows calculation of the separation distance between the trigger coils and the difference in level of magnetic field intensity between the triggers at a remote point detected by the tag. FIG. 8 shows a remote point of 1 m ("a" in the figure), a remote point of 2 m ("b" in the figure), a remote point of 3 m ("c" in the figure), a remote point of 4 m ("d" in the figure), a remote point of 5 m ("e" in the figure), a remote point of 6 m ("f" in the figure), a remote point of 7 m ("g" in the figure). Referring to FIG. 8, if the remote point is 1 m, the level difference between the trigger signals is 8 dB when the trigger separation distance is 30 cm. If the remote point is 7 m, the level difference between the trigger signals is 8 dB when the trigger separation distance is 2.2 m.

A method for extending in both positive and negative directions a trigger magnetic field that can be detected by the tag will be described.

Figure 9:
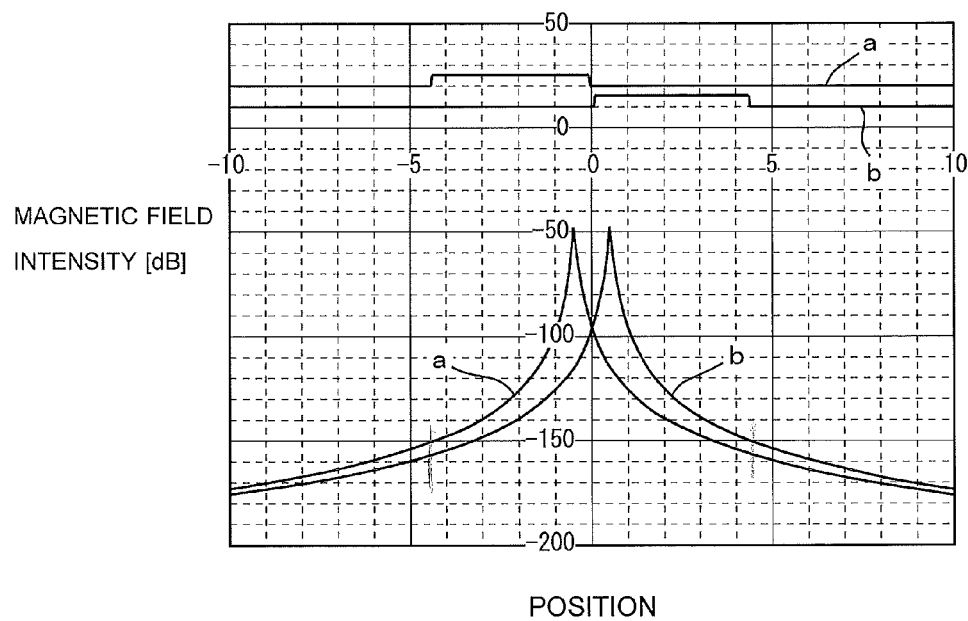
FIG. 9 is a diagram showing a detectable range of the tag when the two trigger coils are separated from each other by 1 m.

FIG. 9 is a diagram showing a detectable range of the tag when the two trigger coils are separated from each other by 1 m. In the figure, X-axis represents the position, and Y-axis represents the magnetic field intensity. The detection widths of the triggers 1, 2 are shown by the protruding portions in the upper part of the graph. The trigger 1 is shown by "a" and the trigger 2 is shown by "b." Referring to FIG. 9, if the interval between the coils is 1 m, there is a level difference of 6 dB or more up to the remote point of 4.5 m.

(2) First Embodiment

Method Using Magnetic Field Attenuating Material

A specific configuration of the trigger signal generating device will be described below. An element (attenuating means) that attenuates the magnetic field intensity by 5.25 dB or more is interposed between the trigger coil 1 and the trigger coil 2 so that the trigger coil 1 and the trigger coil 2 attenuate each other's magnetic fields. This can extend the range in which the tag can detect the trigger magnetic field in the space covered by each trigger coil. The level difference of 5.25 dB or more is used because this is the minimum level difference with which only one trigger coil can be detected and one trigger coil is not affected by the other trigger coil when the trigger coils are separated from each other by 40 mm.

Figure 10:
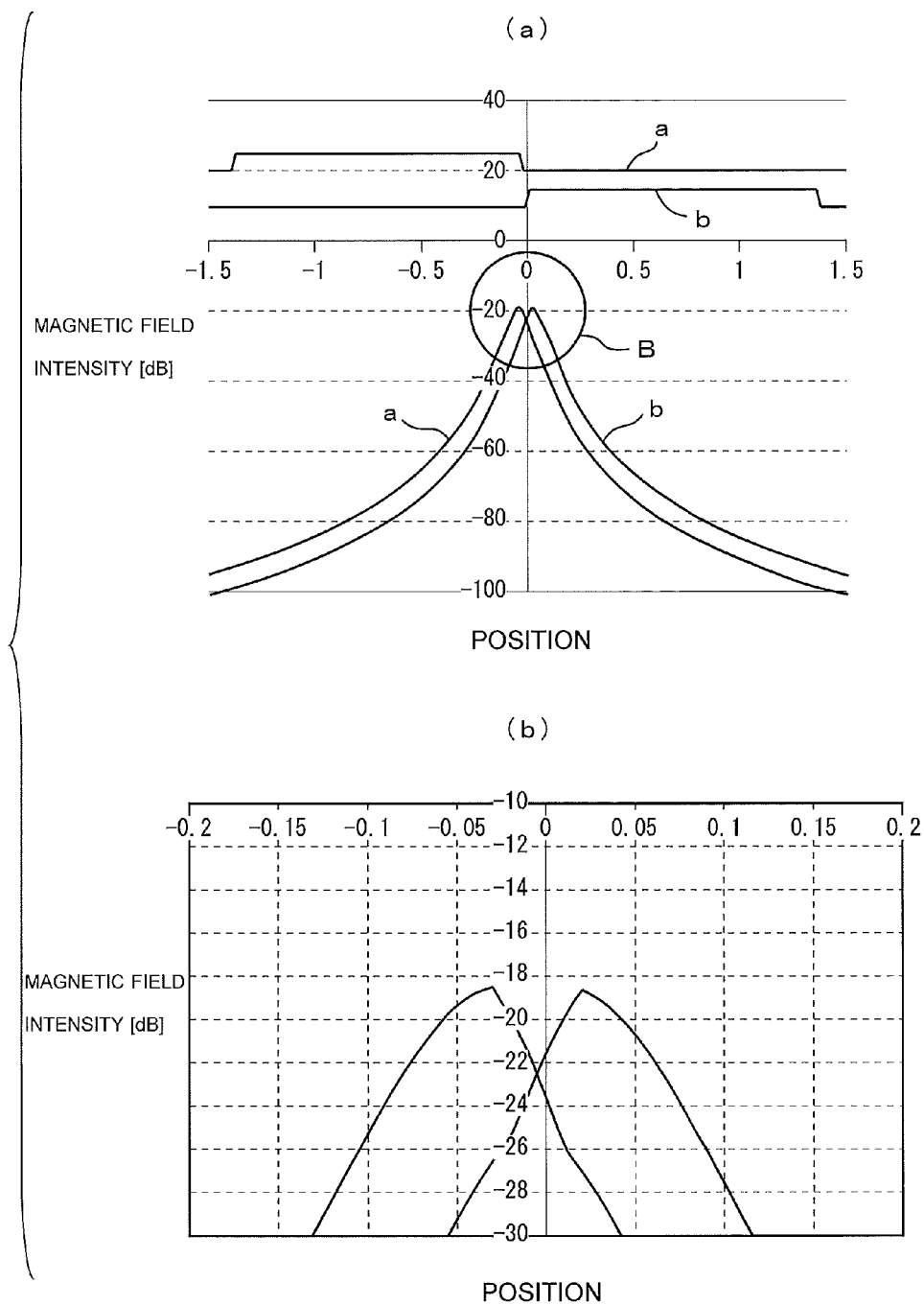
FIGS. 10A and 10B are graphs showing the state in the case where an element that attenuates the magnetic field is interposed between the trigger coil 1 and the trigger coil 2.

FIG. 10A is a graph showing this state. Like the graph described above, X-axis represents the position (m), and Y-axis represents the magnetic field intensity (dB). The protruding portions in the upper part of the graph show the respective detection ranges of the trigger coils. The trigger coil 1 is shown by "a" and the trigger coil 2 is shown by "b." FIG. 10B is an enlarged view of a portion shown by "B" in FIG. 10A.

Referring to FIGS. 10A and 10B, in order to implement a compact device, the two trigger coils are separated from each other by about 40 mm, and the element that attenuates the magnetic field intensity is interposed therebetween, whereby an area can be created where the tag can detect an ID of a trigger magnetic field (trigger ID) only in the space covered by each trigger coil. The separation of about 40 mm can be reduced to a smaller value, e.g., about several millimeters, if the level difference of 5.25 dB or more between the two trigger coils can be maintained as described above.

In the present embodiment, the ID tag does not output its own ID unless it detects the ID of the trigger coil.

Figure 11:
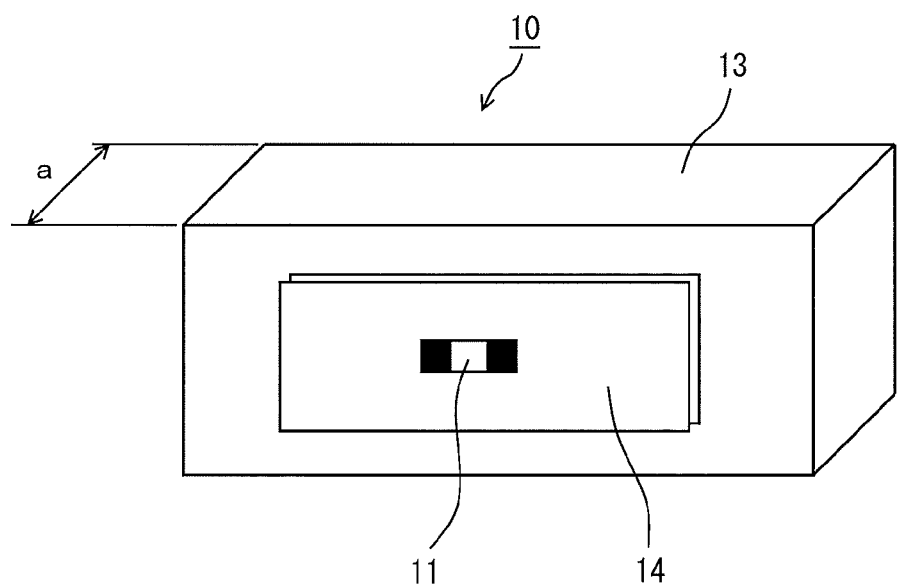
FIG. 11 is a perspective view of a trigger signal generating device produced as a sample.
Figure 12:
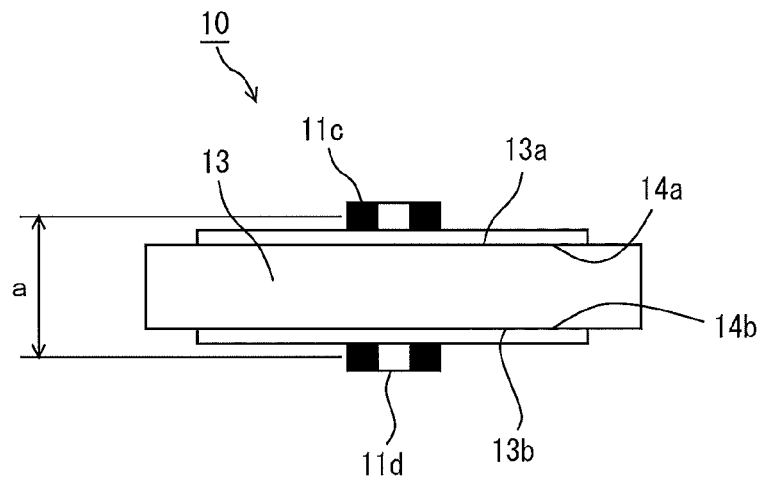
FIG. 12 is a top view of the trigger signal generating device.

FIG. 11 is a perspective view of a trigger signal generating device 10 produced as a sample based on this idea, and FIG. 12 is a top view of the trigger signal generating device 10 of FIG. 11. Referring to FIGS. 11 and 12, the trigger signal generating device 10 includes an aluminum box 13 made of, e.g., aluminum and having two surfaces 13a, 13b that face each other in parallel, spacers 14a, 14b as insulators provided on the opposing two surfaces 13a, 13b of the aluminum box 13, and trigger coils 11c, 11d provided substantially in the center of the spacers 14a, 14b. The spacer 12 is made of, e.g., an insulating material (plastic). The aluminum box is formed by an aluminum plate having a thickness of 1 mm, and has dimensions of 150×200×30 (mm). The trigger coils 11c, 11d are attached at an interval "a" of 40 mm.

Figure 13:
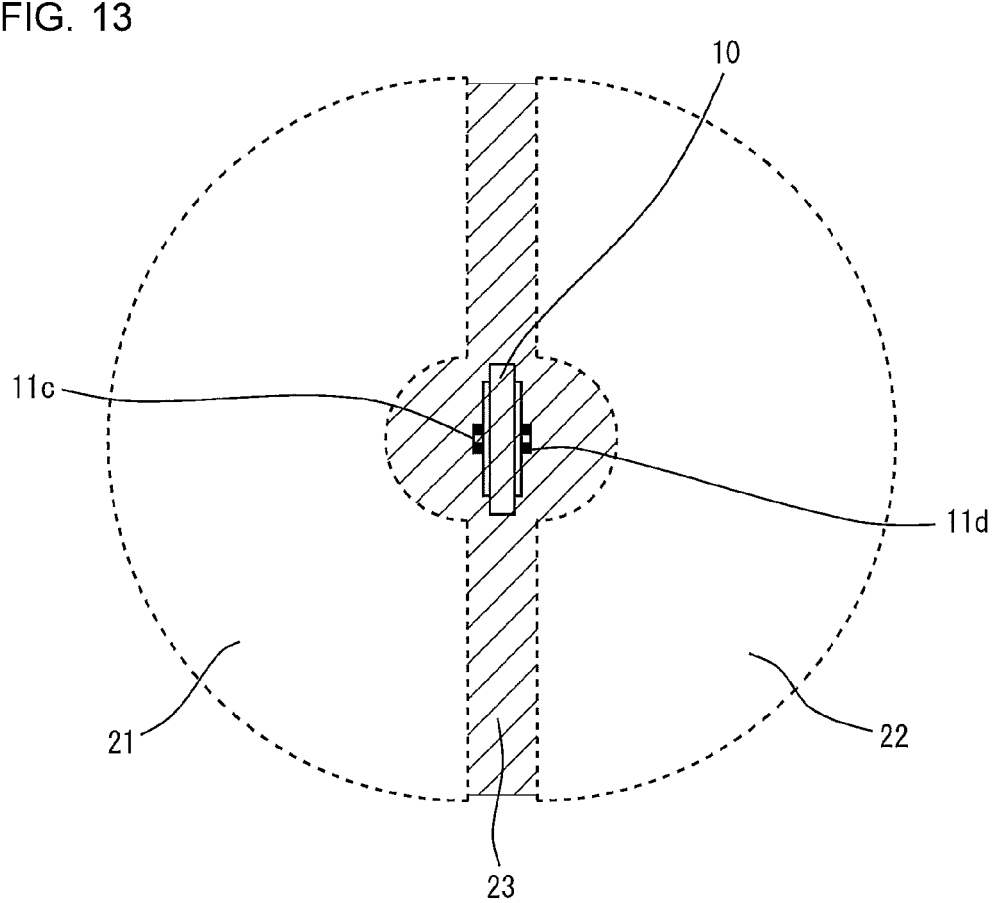
FIG. 13 is a diagram showing the operating range of the trigger signal generating device 10.

FIG. 13 shows an operating range of this trigger signal generating device 10. As shown in FIG. 13, the operating range of the trigger signal generating device 10 has a spherical shape about the trigger signal generating device 10. The trigger coil 11c covers one hemisphere 21, and the trigger coil 11d covers the other hemisphere 22. A maximum of 64 dB and the distance ratio of 10.79 are obtained in this range.

The shaded portion in FIG. 13 represents an undetectable region extending about the trigger coils 11c, 11d and having magnetic field intensity higher than the upper limit of the dynamic range of the tag, and an invalid trigger area 23 created by the level difference of less than ±6 dB between the trigger signals of the trigger coils 11c, 11d of the aluminum box 13.

(3) Second Embodiment

Method for Implementing Small Separation Distance and Large Detection Range without Using Magnetic Field Attenuating Material Another embodiment will be described below. In the present embodiment, the signal level of one area is reduced to the level difference obtained by the separation distance, so that only the other area can be detected. The level in the area to be detected as a signal is designed so that the synthesized level of the level difference obtained by the separation distance and the reduced level in the interfering area is 6 dB or more and the level difference in the interfering area on the opposite side is less than 6 dB. With this design, a signal is not detected in the interfering area. However, a detection area can be created in both areas by switching the side outputting a signal and the side outputting an interfering signal at a high speed.

Figure 14:
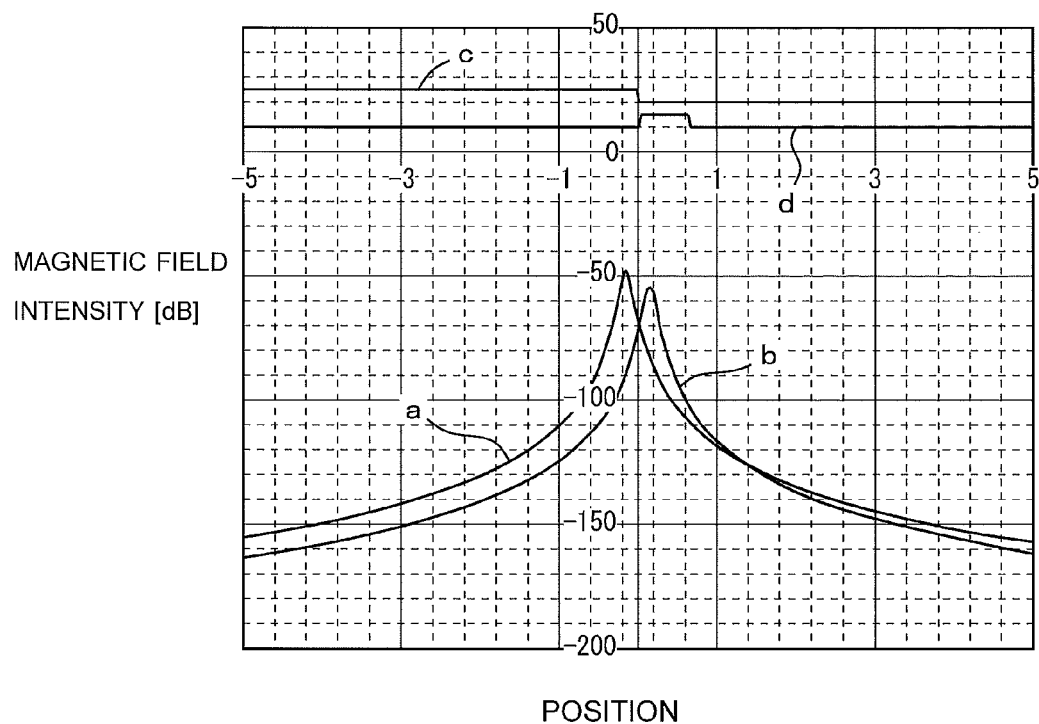
FIG. 14 is a diagram showing an example in which the separation distance between the trigger coil 1 and the trigger coil 2 is 0.3 m, the level difference is 6 dB, and the negative region of X-axis is the detection area.

FIG. 14 shows an example in which the separation distance between the trigger coil 1 and the trigger coil 2 is 0.3 m, the level difference is 6 dB, and the negative region of X-axis is the detection area. As in the graphs described above, X-axis represents the position (m), and Y-axis represents the magnetic field intensity (dB). The trigger coil 1 is shown by "a," and the trigger coil 2 is shown by "b." Regarding the detection ranges of the trigger coils shown in the upper part of the graph, "c" represents the detection range of only the trigger coil 1, and "d" represents the detection range of only the trigger coil 2. As shown by "c" in the figure, only the tag on the trigger coil 1 side can be detected in this example.

Figure 15:
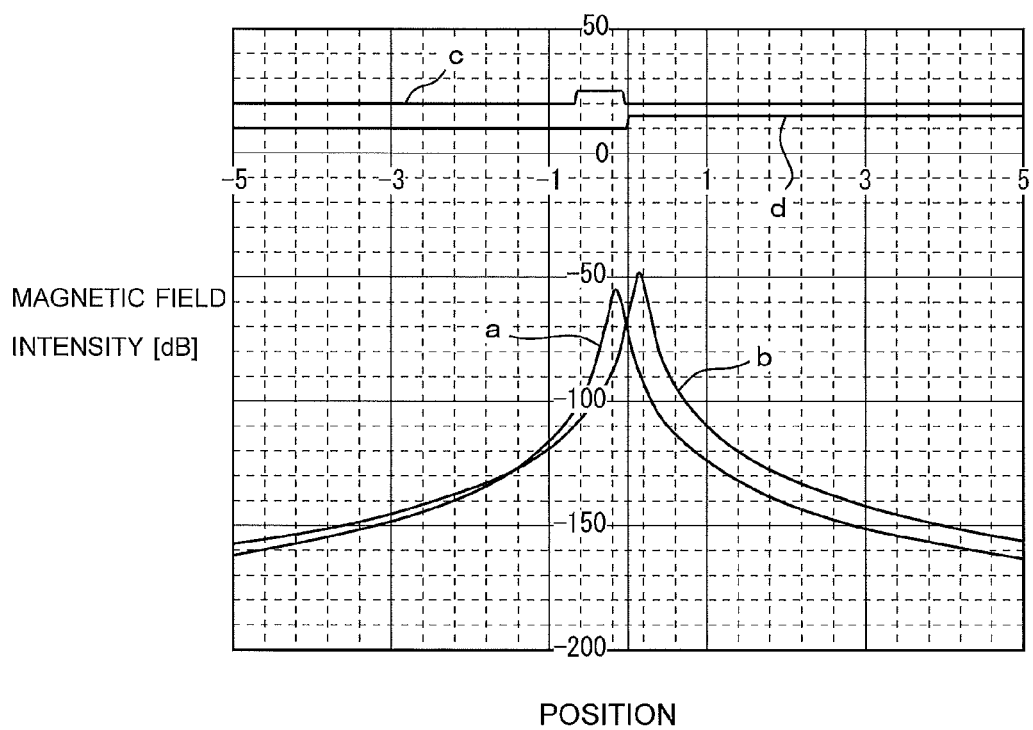
FIG. 15 is a diagram showing an example in which the separation distance is 0.3 m, the level difference is 6 dB, and the positive region of X-axis is the detection area.

FIG. 15 shows an example in which the separation distance is 0.3 m, the level difference is 6 dB, and the positive region of X-axis is the detection area. In this figure as well, X-axis represents the position (m), and Y-axis represents the magnetic field intensity (dB). The trigger coil 1 is shown by "a," and the trigger coil 2 is shown by "b." Regarding the detection ranges of the trigger coils shown in the upper part of the graph, "c" represents the detection range of only the trigger coil 1, and "d" represents the detection range of only the trigger coil 2. As shown by "d" in the figure, only the ID tag on the trigger coil 2 side can be detected in this example.

A moving object management system using the above trigger signal generating device 10 will be described below. FIGS. 16A and 16B are diagrams showing such a moving object management system. FIG. 16A is a diagram showing the overall configuration of the moving object management system, and FIG. 16B is a block diagram of a trigger signal generating circuit that generates a trigger signal from the trigger coils 11c, 11d shown in FIG. 16A. Referring to FIGS. 16A and 16B, the moving object management system includes the trigger signal generating device 10 embedded in a door 30 provided at an entrance/exit of a room etc., a tag 31 that is activated by the trigger signal generating device 10, and a receiver 35 that receives a trigger ID and a tag ID that are output from the tag 31.

An example will be described below in which the tag 31 held by a person etc. is moved from a position 31a (one side of the door) to a position 31b (the other side of the door).

When the tag 31 is located at the position 31a, the tag is activated by the trigger coil 11c located on one side, and outputs the ID of the trigger coil 11c and its own ID. Thereafter, if the tag 31 is moved to the position 31b, the tag 31 is activated by the trigger coil 11d located on the other side, and outputs the ID of the trigger coil 11d and its own ID. In response to these IDs, the receiver 35 detects that the tag 31 has been moved from one side of the door to the other side.

A separate computer, not shown, may be provided for specific detection, and this computer may detect the moving direction based on the information from the receiver 35. In this case, a time detector may be provided, and the time of reception by the receiver 35 etc. may also be stored.

Figure 17:
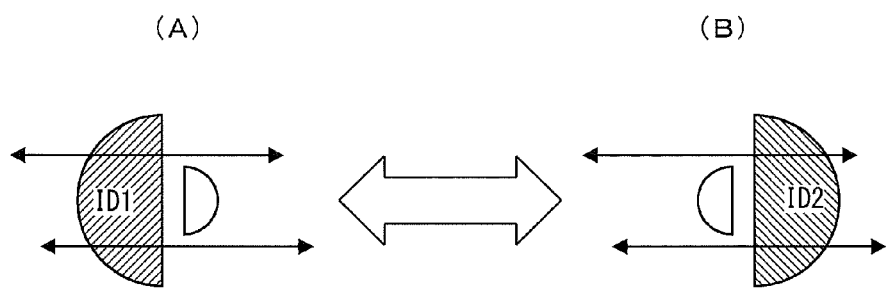
FIGS. 17A and 17B are diagrams showing an area where one side of the central portion (0 m) between the trigger coils 1, 2 can be detected.

The present embodiment is based on theoretical values. Accordingly, one side can be detected to an infinite distance from the central portion (0 m) between the trigger coils 1, 2, as shown in FIGS. 17A and 17B. However, there is actually a limit because the level difference becomes infinitely close to 6 dB with the distance ratio of 10.79 by the dynamic range, the sensitivity of the tag, and the signal level being reduced and an unstable region continues to increase. Moreover, since two states are switched by time, the response speed is reduced by half.

In this example, however, at least one of the hemispheres can be made to serve as a detection range by one of the trigger coils. Accordingly, the following applications can be implemented by using this configuration.

(a) Applications to entrance/exit management of a moving object that can be easily installed, and moving object research thereof.

(b) Moving object management by attachment of the system to partitions, doors, or sidewalls of the doors in offices etc.

(c) Moving object management that can limit the direction of the detection range and that is not affected by the way a moving object is held.

(d) Even if only a passageway is detected or the system is installed on the wall of a room, no detection area is created by leakage into the room. Accordingly, only the area below the ceiling is detected, and no detection area is created on the floor above the ceiling.

Figure 18:
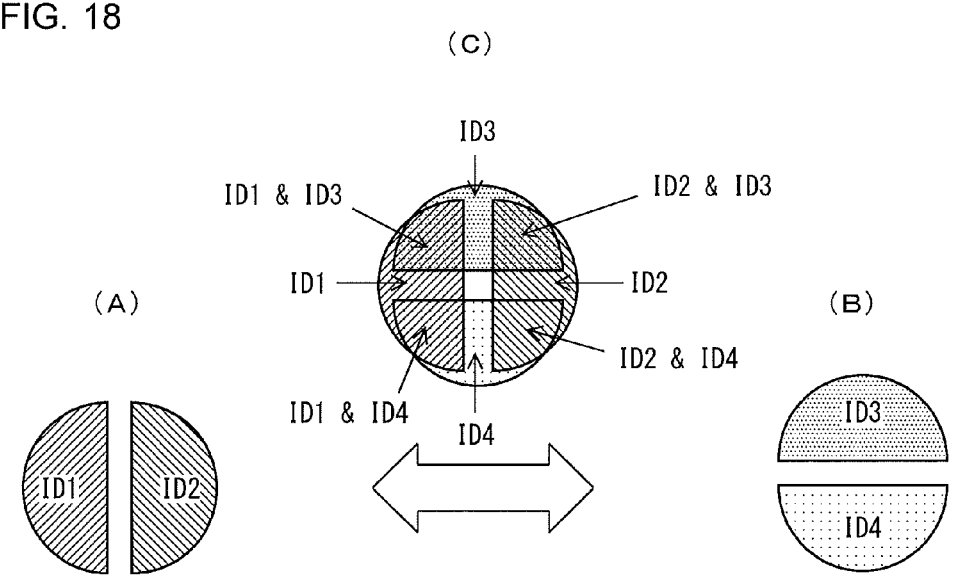
FIGS. 18A to 18C are diagrams showing other embodiments of the present invention.
Figure 19:
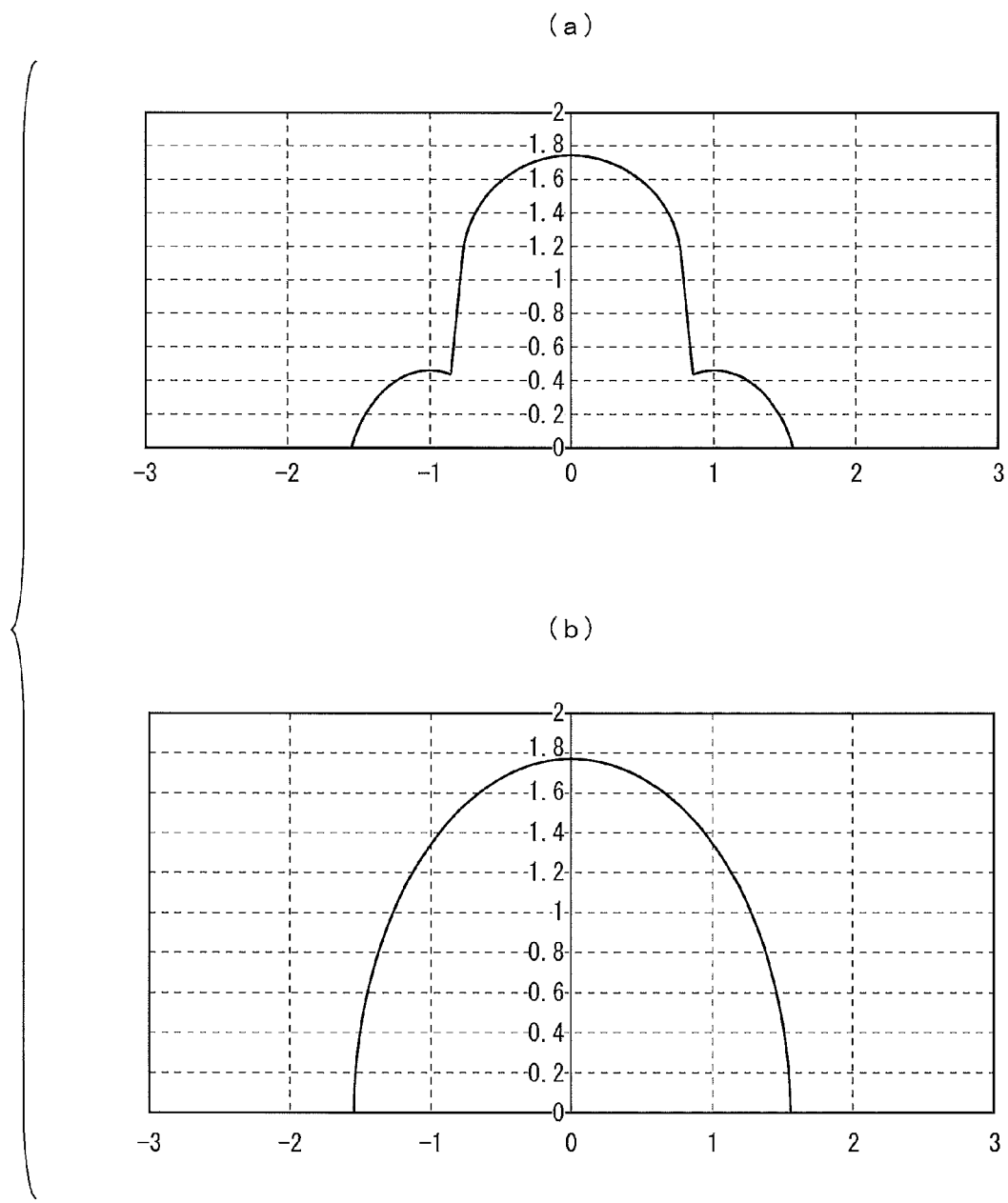
FIGS. 19A and 19B are diagrams showing a detection range of a tag using a trigger signal in conventional examples.
Figure 20:
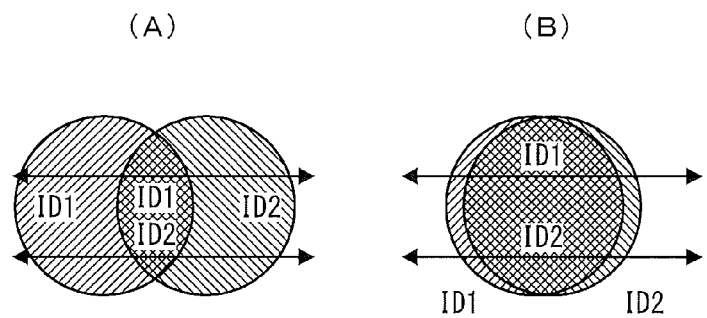
FIGS. 20A and 20B are diagrams showing a response region of a tag which is obtained by connecting spheres produced by trigger generators of two IDs.
Figure 21:
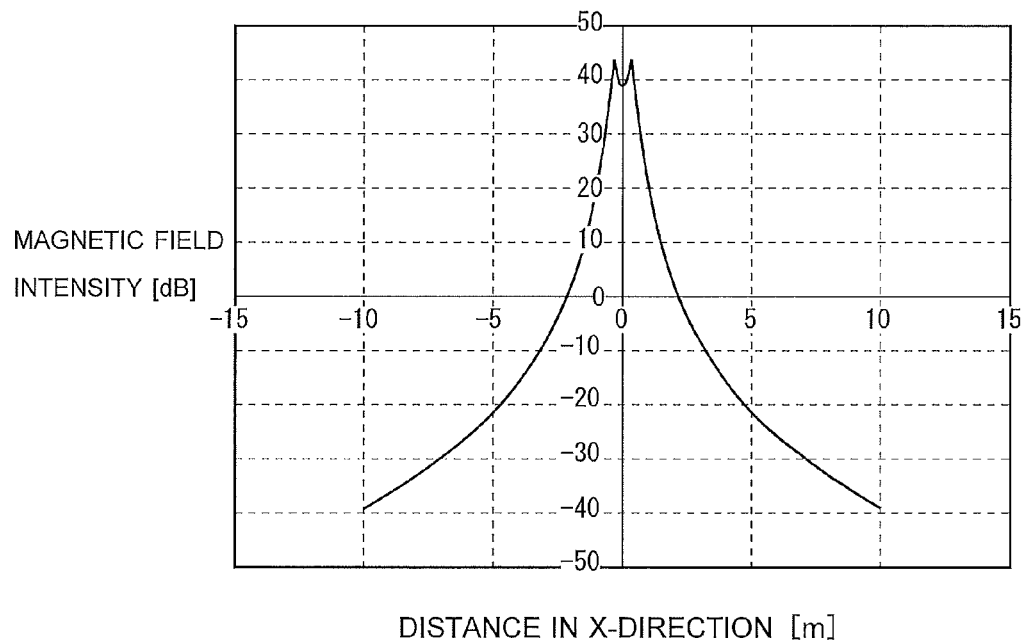
FIG. 21 is a diagram showing the distance from a trigger coil and magnetic field intensity in the conventional example.
Figure 22:
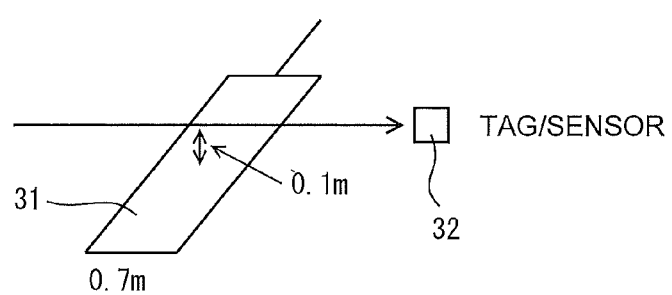
FIG. 22 is a diagram showing the positional relation between the trigger coil and the tag in the conventional example.
Figure 23:
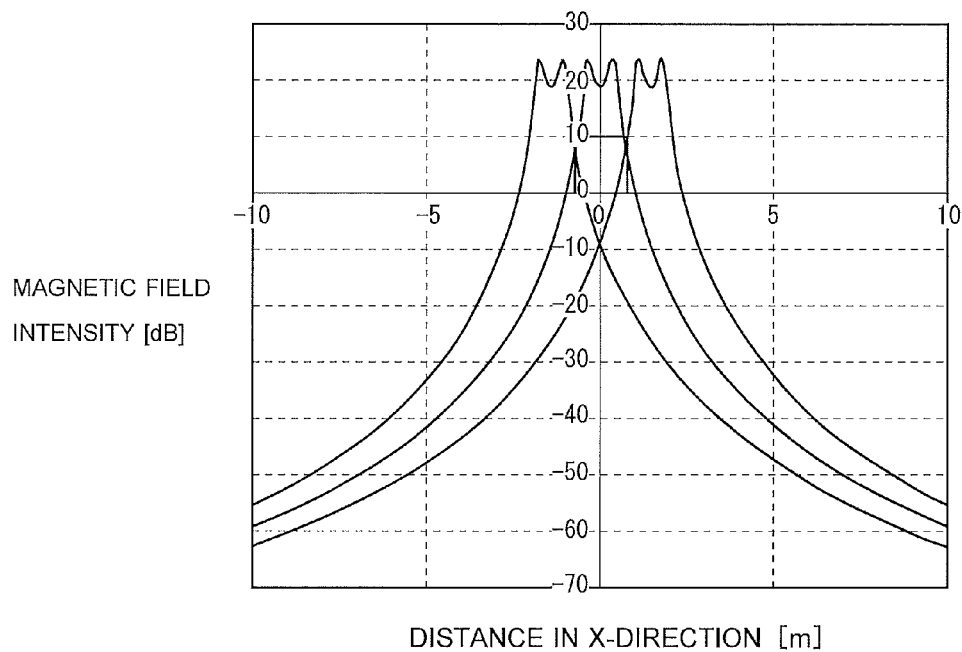
FIG. 23 is a diagram showing the state where three trigger coils in Patent Literature 2 are arranged so that they can deliver their expected performance.

Other embodiments of the present invention will be described below. In the above embodiments, as shown in FIG. 18A, the detection area is divided into two areas (ID1, ID2) in the X-axis direction by using the trigger coils 1, 2. Based on a similar idea, as shown in FIG. 18B, the detection area can be divided into two areas (ID3, ID4) in the Y-axis direction. Accordingly, the detection area can be divided into four areas (ID1 and ID3, ID2 and ID3, ID1 and ID4, and ID2 and ID4) by superimposing FIGS. 18A and 18B on each other. Similarly, the detection area can be divided into eight or sixteen areas.

By using this configuration, the direction and azimuth of a moving object can be detected in a plurality of directions. Accordingly, the present invention can be applied to movement or entrance/exit management using a moving object provided with trigger coils and using a tag as a position marker, entrance/exit management, automatic opening/closing of doors, detection of safety around heavy construction equipment, forklifts, robots, etc., the moving direction, and entrance/exit.

Although the embodiments of the present invention are described above with reference to the drawings, the present invention is not limited to the illustrated embodiments. Various modifications and variations can be made to the illustrated embodiments within a scope that is the same as, or equivalent to that of the present invention.

INDUSTRIAL APPLICABILITY

According to the present invention, a compact trigger signal generating device having a large detection area can be provided. Accordingly, the present invention is advantageously used as a trigger signal generating device and a moving object management system using the same.

REFERENCE SIGNS LIST

10 trigger signal generating device
11 ferrite coil
12 copper wire
13 aluminum box
14 spacer
20 trigger unit
21 resonant capacitor
22 signal generator
30 door
31 tag
35 receiver

The invention claimed is:
1. A trigger signal generating device that outputs a trigger signal activating an IC tag, comprising:
  first and second trigger coils placed so as to face each other at a predetermined separation distance and each having a predetermined magnetic field intensity distribution; and attenuating means for attenuating an intensity of a magnetic field generated by said first and second trigger coils to a predetermined level that allows said ID tag to detect trigger IDs of said first and second trigger coils on a side on which said first and second trigger coils are provided, and that does not allow said ID tag to detect said trigger ID of said first trigger coil on an opposite side to said side on which said first and second trigger coils are provided.

2. The trigger signal generating device according to claim 1, wherein
said attenuating means is a magnetic field attenuating material provided between said first and second trigger coils.

3. The trigger signal generating device according to claim 2, wherein
said magnetic field attenuating material is a non-magnetic metal.

4. The trigger signal generating device according to claim 1, wherein
said first and second trigger coils are held by a holding member having one surface and the other surface which face each other,
said first and second trigger coils generate the same magnetic field intensity distribution, and
said attenuating means is a means for shifting said magnetic field intensity distribution generated by said first trigger coil and said magnetic field intensity distribution generated by said second trigger coil from each other by a predetermined level.

5. The trigger signal generating device according to claim 1, wherein
said trigger coils are made of ferrite.

6. The trigger signal generating device according to claim 1, wherein
said ID tag is an ID tag capable of detecting three-dimensional magnetic field intensity.

7. A moving object management system using said trigger signal generating device according to claim 1.

* * * * *